(12) United States Patent
Pozzetti et al.

(10) Patent No.: US 11,898,664 B2
(45) Date of Patent: Feb. 13, 2024

(54) UNIVERSAL INDISSOLUBLE PIPE CONNECTION SYSTEM AND JOINT COMPRISED IN SAID SYSTEM

(71) Applicant: Raccorderie Metalliche S.p.A., Campitello di Marcaria (IT)

(72) Inventors: Silvio Pozzetti, Borgo Vigilio (IT); Stefano Nosé, Rivalta sul Mincio (IT)

( * ) Notice: Subject to any disclaimer, the term of this patent is extended or adjusted under 35 U.S.C. 154(b) by 1343 days.

(21) Appl. No.: 16/321,025

(22) PCT Filed: Sep. 18, 2017

(86) PCT No.: PCT/IB2017/055630
§ 371 (c)(1),
(2) Date: Jan. 27, 2019

(87) PCT Pub. No.: WO2018/051299
PCT Pub. Date: Mar. 22, 2018

(65) Prior Publication Data
US 2021/0285576 A1    Sep. 16, 2021

(30) Foreign Application Priority Data
Sep. 19, 2016    (IT) .......................... 102016000093853

(51) Int. Cl.
*F16L 13/14*    (2006.01)
*B21D 39/04*    (2006.01)
*B25B 27/10*    (2006.01)

(52) U.S. Cl.
CPC .......... *F16L 13/142* (2013.01); *B21D 39/046* (2013.01); *B25B 27/10* (2013.01); *F16L 2013/145* (2013.01)

(58) Field of Classification Search
CPC ....... F16L 13/14; F16L 13/141; F16L 13/142; F16L 13/143; F16L 2013/145; B21D 39/046; B21D 39/04; B25B 27/10
(Continued)

(56) References Cited

U.S. PATENT DOCUMENTS 3,596,939 A * 8/1971 Gibson ...................... 285/382.2
5,168,618 A * 12/1992 Unewisse ............. F16L 13/142
(Continued)

FOREIGN PATENT DOCUMENTS

DE    20002952    6/2001
DE    10144100    2/2003
(Continued)

OTHER PUBLICATIONS

EP 0343395 B1—Machine Translation—English (Year: 1996).*

*Primary Examiner* — William S. Choi
(74) *Attorney, Agent, or Firm* — Themis Law

(57) ABSTRACT

A universal pipe connection system includes a fitting with a tubular body and an annular bulge defining an annular groove on the inner side of a tubular body, which houses a sealing gasket. The tubular body receives the end portion of a pipe so that a pressing tool having opposite pressing jaws can engage the tubular body and generate a circumferential band adjacent to the bulge by mechanically clamping the tubular body in the circumferential and axial directions and causing a deformation of the annular bulge, which presses the gasket, and generates a seal between the tubular body and the end of the pipe inserted therein. The annular bulge and the corresponding annular groove have a geometry and size adapted to cooperate with two different types of pressing tools, one with a M profile and one with a V profile, which may be present in the alternative or in combination.

8 Claims, 4 Drawing Sheets

COUPLING OF PRESSFITTING JUNCTION WITH TOOL HAVING M PROFILE

(58) Field of Classification Search
USPC .................................. 285/382, 382.1, 382.2
See application file for complete search history.

(56) References Cited

U.S. PATENT DOCUMENTS 5,484,174 A * 1/1996 Gotoh .................... F16L 13/142
                                                    285/382.2
2012/0161438 A1* 6/2012 Rischen ................ F16L 13/142
                                                    285/382
2015/0354737 A1* 12/2015 Stout ..................... F16L 13/142

FOREIGN PATENT DOCUMENTS

| DE | 102006050427 | 2/2008 | |
|---|---|---|---|
| EP | 343395 B1 * | 6/1996 | ............ F16L 13/142 |
| EP | 1260741 | 11/2002 | |
| EP | 1547728 | 6/2005 | |
| EP | 1628062 | 2/2006 | |
| EP | 2236889 | 10/2010 | |

* cited by examiner

COUPLING OF PRESSFITTING JUNCTION WITH TOOL HAVING M PROFILE

COUPLING OF PRESSFITTING JUNCTION WITH TOOL HAVING V PROFILE

| | SAG15v -PROD- | SAG18v -PROD- | SAG22v -PROD- | SAG28v -PROD- | SAG35v -PROD- | SAG42v -PROD- | SAG54v -PROD- | |
|---|---|---|---|---|---|---|---|---|
| A | Ø18.2 +1.2/-0.5 | Ø21.1 +1.2/-0.5 | Ø25.2 +1.2/-0.5 | Ø31.4 +1.2/-0.5 | Ø38.4 +1.2/-0.5 | Ø45.5 +1.2/-0.5 | Ø57.5 +1.2/-0.5 | A |
| Be | Ø23.1 +1.1/-0.5 | Ø26.1 +1.1/-0.5 | Ø30.8 +1.1/-0.5 | Ø37.3 +1.1/-0.5 | Ø44.1 +1.1/-0.5 | Ø53.0 +1.1/-0.5 | Ø65.0 +1.1/-0.5 | Be |
| Bi | Ø20.1 +1.1/-0.5 | Ø23.1 +1.1/-0.5 | Ø27.7 +1.1/-0.5 | Ø34.1 +1.1/-0.5 | Ø41.1 +1.1/-0.5 | Ø50.0 +1.1/-0.5 | Ø62.0 +1.1/-0.5 | Bi |
| C | Ø15.2 +0.8/-0.5 | Ø18.3 +0.8/-0.5 | Ø22.3 +0.8/-0.5 | Ø28.4 +0.8/-0.5 | Ø35.4 +0.8/-0.5 | Ø42.5 +0.8/-0.5 | Ø54.5 +0.8/-0.5 | C |
| H | 10 +0.8/-0.8 | 10 +0.8/-0.8 | 10 +0.8/-0.8 | 10 +0.8/-0.8 | 10 +0.8/-0.8 | 13 +0.8/-0.8 | 16 +0.8/-0.8 | H |
| Ra | 1.25 +0.25/-0.25 | 1.25 +0.25/-0.25 | 1.5 +0.25/-0.25 | 1.5 +0.25/-0.25 | 1.5 +0.25/-0.25 | 1.95 +0.25/-0.25 | 1.95 +0.25/-0.25 | Ra |
| Rb | 0.5 +0.25/-0.25 | 0.5 +0.25/-0.25 | 0.5 +0.25/-0.25 | 0.5 +0.25/-0.25 | 0.5 +0.25/-0.25 | 0.5 +0.25/-0.25 | 0.5 +0.25/-0.25 | Rb |
| T | 1.5 +0.8/-0.5 | 1.5 +0.8/-0.5 | 1.5 +0.8/-0.5 | 1.5 +0.8/-0.5 | 1.5 +0.8/-0.5 | 1.5 +0.8/-0.5 | 1.5 +0.8/-0.5 | T |

…

UNIVERSAL INDISSOLUBLE PIPE CONNECTION SYSTEM AND JOINT COMPRISED IN SAID SYSTEM

FIELD OF THE INVENTION

The present invention relates to a universal pipe connection system comprising:

a fitting element comprising a tubular body with an annular bulge at least at an and portion which annular bulge forms on the inner side of the tubular body an annular groove housing a sealing gasket which groove is open towards the inside of the tubular body and which end portion extends on the side opposite to the end of the fitting by a cylindrical portion, said tubular body forming a fitting socket for the end portion of a pipe;

at least one pressing tool having at least two opposite pressing jaws which are intended to cooperate with said end portion of the fitting, by surrounding it along its circumference and they have a profile of the surface in contact with said end portion shaped such to press said end portion against the end of a pipe inserted into said fitting, determining in at least one circumferential band adjacent to the bulge a contemporaneous deformation of the wall of the pipe and of said end portion that are mechanically clamped together in the circumferential and axial direction and a deformation of the annular bulge that presses the gasket generating tightness between said tubular body and the end of the pipe fitted therein.

BACKGROUND OF THE INVENTION

Such technique is currently widely used and different types of profiles for the so-called press fittings have been developed over time. For each fitting profile there is provided a corresponding pressing tool having jaws shaped correspondingly to the profile of the fitting and intended to compress the fitting such to generate mechanical clamping effect and tight sealing effect.

Among the several currently available profiles, the ones that are widely spread on the market are so called M profiles and V profiles.

The document DE92725280 discloses a typical M profile fitting and an example of the profile of the jaws of the pressing pliers. In this case, the bulge is provided at the end of the tubular body of the fitting, forming an end element similar to a hook when seen in axial section.

The pressing pliers act on the bulge and have such a profile to squash the bulge against the gasket taking a substantially trapezoidal or triangular axial section. This causes the gasket to fill the annular groove and leads to the generation of a contact area of the gasket against the end of the pipe inserted in the fitting that is continuous in the circumferential direction and that has a longer length in the axial direction.

In an axially more internal region and at a given distance from the bulge, along an annular band of the tubular body, the profile of the pressing jaws is made with such a shape to generate at least a radial recess, preferably a circumferential crown of radial recesses both in the wall of the fitting and in the wall of the pipe inserted therein. Such radial recesses mechanically lock the two parts to each other both as regards displacements in axial direction and as regards relative rotations of said two parts.

Therefore in case of M profile, upon pressing, a deformation at two levels occurs. At the first level, after mechanical deformation of the fitting and of the pipe, an indissoluble connection occurs that guarantees the mechanical strength thereof. At the second level, the water-tight effect is generated that is guaranteed by the O-ring being deformed in its cross-section and that, by means of its elasticity, guarantees the permanent tightness of the connection.

The document EP361630 describes a further example of an M profile with relevant pressing pliers.

The document DE10044675 as well as document EP 0343395 show a fitting with a typical V profile.

In this case the most glaring difference with respect to M profile is that the annular bulge is provided on the end portion in an intermediate position between two cylindrical portions.

The process for mechanically and tightly coupling the fitting with the end of the pipe is similar to that of M profile fittings. The end of the pipe is inserted in the fitting up to an abutment and then the shaped end of the fitting is pressed on the pipe by means of a suitable jaw, operated by a press.

By means of the end cylindrical portion, the V profile fittings somewhat act as a guide maintaining the pipe as straight and protect the sealing gasket during the insertion of the pipe, namely during the mutual axial sliding of the pipe along the fitting and up to the abutment. Such gasket typically is an O-ring.

While in the pressing process with M profile two deformations are carried out, the pressing provided for V profile causes three deformations. The first, in radial direction, presses the O-ring into the shaped chamber and guarantees tight sealing effect on the pipe. The second and third ones deform the geometry of the fitting and of the pipe while preventing, by a mechanical form fit, the fitting and the pipe from slipping out and rotating. The deformation of the geometry can provide also a circumferential crown of radial recesses to be made, or it can provide, in some cases, and as an alternative or in combination, the deformation of the shape of the cross-section of the pipe and of the tubular body of the fitting from circular to polygonal one, along a circumferential band provided in each cylindrical portion adjacent to the annular bulge.

Pressfitting connection systems have a number of critical issues that have been faced over time and whose solution requires a compromise among technical expedients that lead to conflicting effects. Critical issues are based on the fact of configuring the geometry of the annular bulge and of the corresponding groove housing the gasket in order to prevent the gasket from being pinched or even squashed too much upon the insertion of the pipe end in the fitting and upon the following deformation during the pressing action. However, at the same time, a cross-section of the groove housing the gasket has to be also guaranteed such that, before pressing, it is large enough to allow the gasket to have some freedom of movement, while, after pressing, it has to guarantee the gasket to be firmly held and the dimensions of the cross-section of the groove in the pressed condition have to be such that the deformed groove is completely filled by the gasket.

Prior art shows many different solutions for such drawback that are different from one another also as regards the type of profile and as regards very specific shape and dimension characteristics.

Therefore due to the fineness of the problem and of technical solutions, even small deviations from the essential geometrical and dimension conditions can lead to a quality reduction of the connection in terms of reliability in generating a mechanical seal and water-tight connection and in terms of duration over time both of the mechanical connection and of the water-tight connection.

Therefore it is clear that for each profile it is necessary to use the corresponding pressing tool. This involves drawbacks, whereby the fitter must always have available the pressing tool suitable for the type of fitting, that is for the type of profile of the joint and if he/she has not the right tool, he/she cannot carry out the operation, since it is not guaranteed that pressing a M profile with a tool for V profile or vice versa can generate a proper mechanical and water-tight connection stable over time.

SUMMARY OF THE INVENTION

The invention aims at overcoming such drawbacks by a system allowing pressfitting techniques to have the greatest flexibility of use with fittings suitable both for pressing tools of M type and pressing tools of V type.

The present invention achieves the above objects by a pipe connection system comprising:

a fitting element comprising a tubular body with an annular bulge at least at an end portion which annular bulge forms on the inner side of the tubular body an annular groove housing a sealing gasket which groove is open towards the inside of the tubular body and which end portion extends on the side opposite to the end of the fitting by a cylindrical portion, said tubular body forming a fitting socket for the end portion of a pipe;

at least one pressing tool having at least two opposite pressing jaws which are intended to cooperate with said end portion of the fitting, by surrounding it along its circumference and they have a profile of the surface in contact with said end portion shaped such to press said end portion against the end of a pipe inserted into said fitting, determining in at least one circumferential band adjacent to the bulge a contemporaneous deformation of the wall of the pipe and of said end portion that are mechanically clamped together in the circumferential and axial direction and a deformation of the annular bulge that presses the gasket generating the tightness between said tubular body and the end of the pipe inserted therein and that in combination provides the following further characteristics:

the annular bulge and the corresponding annular groove are provided at a given axial distance from the end of the end portion of the tubular body, there being provided an initial cylindrical portion between said end and the side of the bulge facing it;

the annular bulge and the corresponding groove having such a geometry and size to cooperate alternatively with a pressing tool having a M profile or V profile;

the system comprises alternatively or in combination both a pressing tool with jaws having a profile corresponding to the M profile of the fitting and a pressing tool with jaws having a profile corresponding to the V profile of the fitting.

According to a further characteristic, the annular bulge and/or the coincident annular groove housing the gasket have side walls composing the two facing radial sides of said bulge and of said groove, which side walls are inclined in a converging direction, symmetrical or asymmetrical with respect to each other, in a direction opposite to the center of the tubular body.

One embodiment provides that between the side walls an angle ranging from 50° to 70°, more specifically from 55° to 65°, preferably of about 60° is formed.

Still according to a further characteristic that can be provided in combination with the previous ones, the sealing gasket has a non-rounded cross-section.

In one embodiment, the gasket has a cross-section widening towards the open side of the housing groove in a manner corresponding to the section shape of said housing groove and whose sides are rounded.

One embodiment provides a gasket with a cross-section with the shape of an isosceles trapezoid with convex bases.

According to a preferred embodiment said gasket has a cross-section substantially with the shape of a geometrical figure enclosed between two segments of the equal sides of an isosceles triangle with the vertex angle ranging from 55° to 65°, a first arc of circumference of radius r inscribed in said isosceles triangle, and an arc of radius 2r centered in the middle point of said first arc.

Still according to a further characteristic, said triangle, in which the shape of the cross-section of the gasket is inscribed, is an equilateral triangle.

The gasket may have an inner diameter equal to or slightly smaller than the inner diameter of the tubular body.

By means of its particular shape, the gasket according to the present invention has a cross-section of increased area with respect to traditional gaskets that can be inserted in the same housing of a press fitting. Therefore, it fills almost completely said housing, and even if it does not generate problems during the pressing of the fitting, it has a compression factor higher than that of conventional gaskets, consequently improving the tightness and duration of the connection over time.

Moreover such characteristic is advantageous in pressing with two different types of pressing tools having pressing jaws shaped correspondingly to the M profile and V profile. Generally, while the pressing of M profiles results in more marked deformations, the deformation of V profiles is less marked and therefore the improvement in the factor of filling the housing groove by the gasket guarantees to reach a tight connection condition safe and stable over time even when the fitting is pressed by a tool intended to press fittings with V profile.

The two sides connect with each other by a curved portion having a radius ranging from 1 to 2.5 mm, in particular from 1.25 to 1.95 mm.

Said radius has a size ranging from 3 to 7% of the diameter of the tubular body.

Said two side walls that is the two sides of the bulge and of the corresponding groove connect with the corresponding cylindrical portion by a curved flare having equal radii of curvature for said two side walls and ranging from 0.25 to 0.75 mm.

The radial projection of the annular bulge changes for outer diameters of the cylindrical portion of the fitting from 18 mm to 60 mm, from about 2 to 4 mm, in particular from 2.45 to 3.75.

The radial projection of the bulge in relation to the outer diameter of the cylindrical portions on the two sides thereof ranges from 5% to 15% of the outer diameter of said cylindrical portions preferably from 6 to 14% of the outer diameter of said cylindrical portions.

The axial distance between the central axis of the annular bulge and the free edge of the cylindrical portion at the inlet of the fitting ranges from 10 to 16 mm for diameters of the cylindrical portion ranging from 20 to 60 mm.

Such axial distance is higher than 20% of the outer diameter of the cylindrical portions, preferably ranging from 25 to 60% of the outer diameter of the cylindrical portions of the fitting.

The thickness of the wall of the fitting is substantially the same for the whole axial length thereof and in the order of magnitude of about 3 mm.

The invention relates also to a fitting for pipes having one or more of the above characteristics in any combination or sub-combination and that is suitable to be compressed indifferently by a pressing tool for M profile and by a pressing tool for V profile.

According to a further characteristic, it has been advantageous to provide, inside the cylindrical portion, at least one abutment against which one of the pipes to be connected rests upon the insertion. Thus, a defined seat for the pipe to be connected is obtained.

As a stopping device here a depression is particularly advantageous, in the form of a rib, an annular, inner radial shoulder and/or a radial sinking in the cylindrical part.

The pressfitting system, as well as the fitting according to the present invention can be made in all the conceivable forms for the different types of uses. For example, in its simplest embodiment, the pressfitting system and the fitting according to the present invention can be provided for connecting the ends of two aligned pipes. But, besides that, the system can also be provided for connecting three pipes that mutually meet as a T, therefore in this case the fitting has a T shape, with three ports for the pipes. There is also the possibility of using the system for connecting two pipes meeting one with the other, for example with an angle of 90°.

Likewise the system and the fitting can be used as a sleeve, a reducer or a curve and similar forms. Finally, the fitting can have a threaded end or a male end regardless of the number of pipes to be connected, such to provide a screw connection.

BRIEF DESCRIPTION OF THE DRAWINGS

These and other characteristics and advantages of the present invention will be clearer from the following description of some embodiments shown in the annexed drawings wherein.

DETAILED DESCRIPTION OF EMBODIMENTS OF THE INVENTION

With reference to figures they show the fitting only as regards an end tightly connecting to a pipe. Such end can be provided firmly coupled to a device such as an inlet/outlet union of a valve, a cock, a filter, a meter or the like or said end is provided on connection ports of joints such as for example elements joining two pipes, union tees, L-shaped fittings, multiway fittings, on at least one of the connection ports or on all the connection ports, the remaining connection ports being provided with other types of fittings such as threaded fittings or with locking rings, or the like, it being obvious for a person skilled in the art to use said fitting as an end of any union for connecting pipes.

Figure 1:
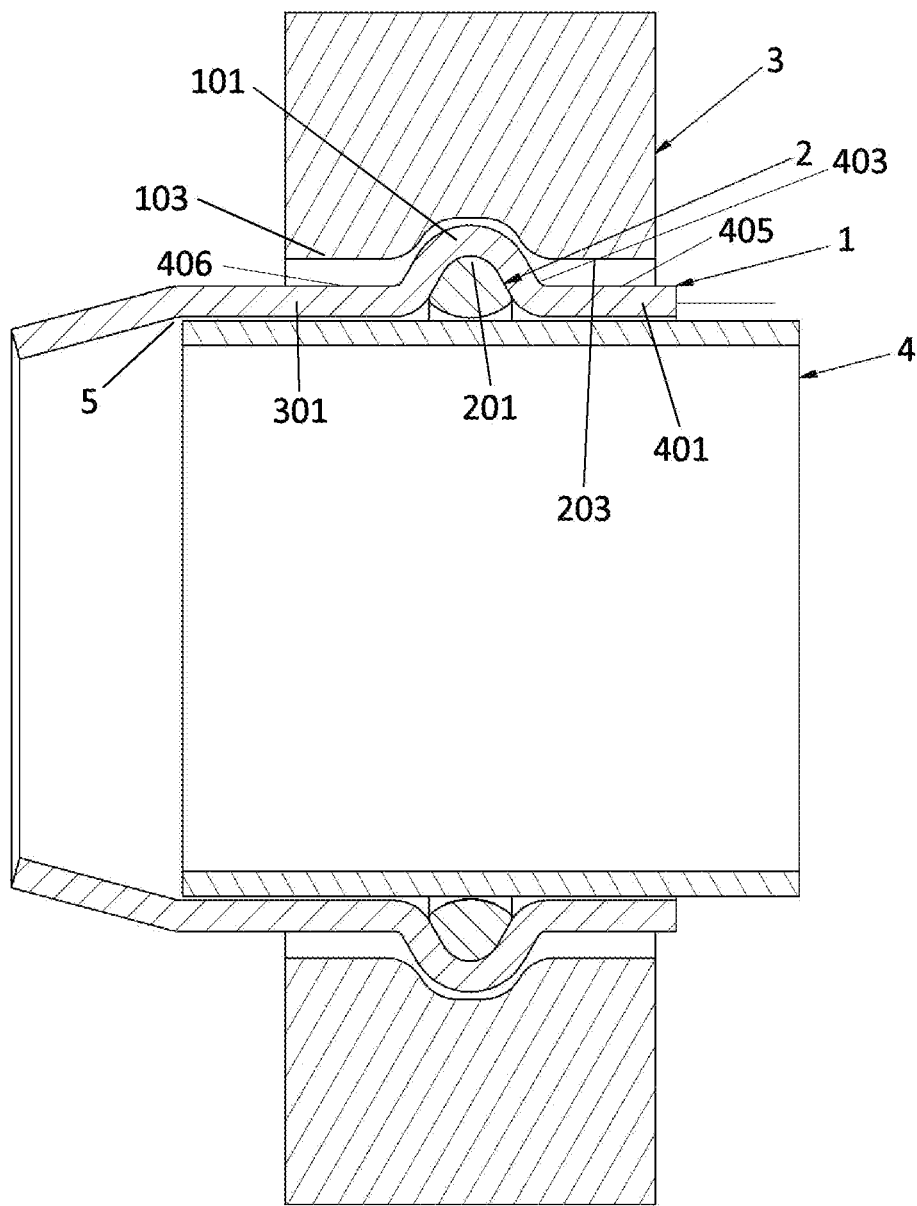
FIG. 1 is a section according to an axial central plane of the fitting according to the present invention associated with a pressing tool whose jaws are shaped such to exert a pressing action on fittings with M profile.
Figure 2:
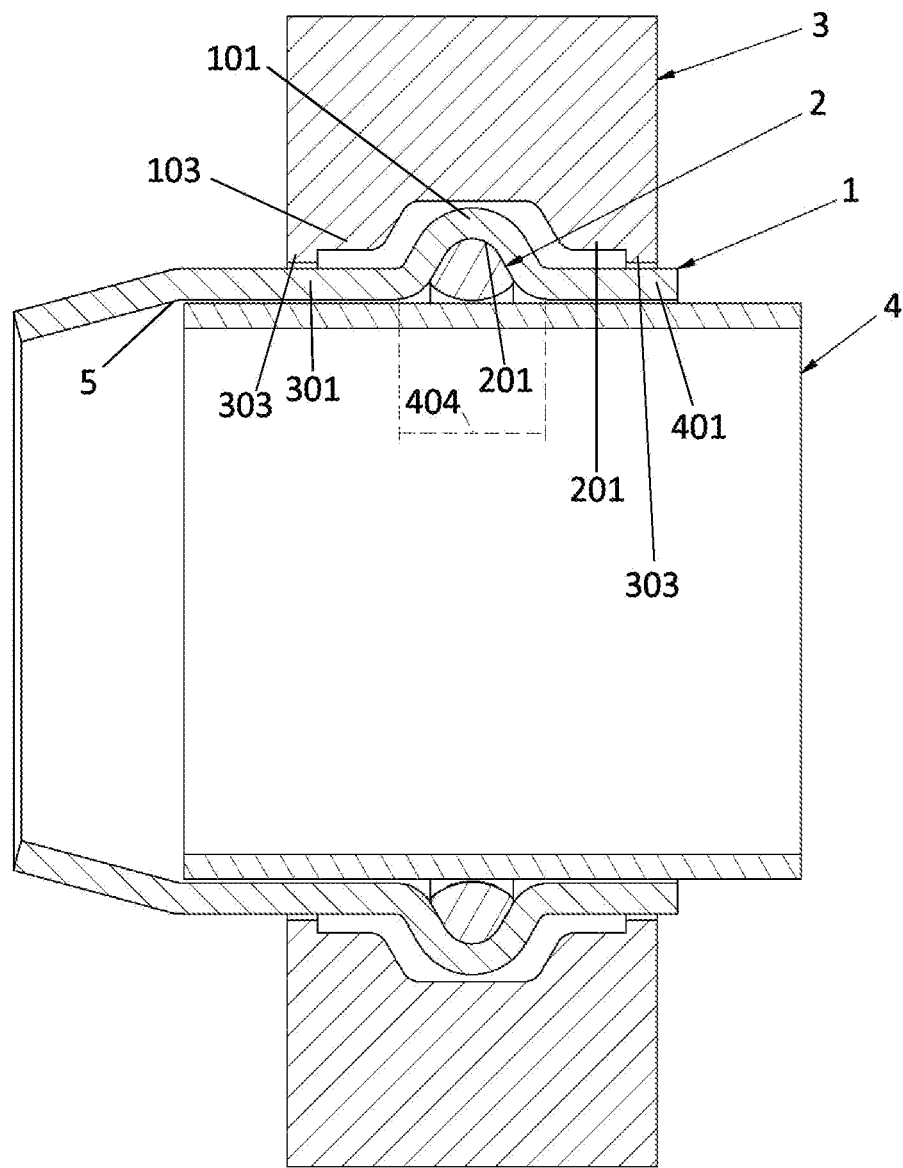
FIG. 2 is a view similar to FIG. 1 wherein the fitting according to the present invention is associated to a pressing tool whose jaws are shaped such to exert a pressing action on fittings with V profile.

As it results from FIGS. 1 to 2, a fitting for a pressfitting system according to the present invention has a tubular body 1, made of metal material, such as for example stainless steel (inox), carbon steel, copper and copper alloys, which has, on an end portion and at a predetermined distance from said free end, an annular bulge 101, seen in longitudinal section of the tubular body 1, protruding from the outer perimeter of the latter. Such annular bulge 101 on the inner side of the tubular body 101 forms a correspondingly shaped annular groove 201 which is opened towards the inside of the tubular body 1 and which is intended to house an annular gasket 2. Said free end is the end for the insertion of an end portion of a pipe or union 4 to be firmly connected both mechanically and tightly to the tubular body 1.

The annular bulge 101 therefore is interposed between two cylindrical portions 301, 401 of the tubular body 1 of which an end portion 301 and a portion 401 connecting to the remaining part of the joint that, as mentioned above, can be a union for the connection to a device or one or more further connection ends of one-way or multiway joint. In particular, the cylindrical portion 401 is disposed between an end 402 of the fitting and a side 403 of the annular bulge 101 that faces the end 402 of the filling.

At the other end of the tubular body 1, the cylindrical portion 401 is provided internally with an annular abutment shoulder 5 for example a radial inner annular rib and/or a radial sinking that is at a given distance from the annular bulge 101 and that is the stop abutment for the insertion of the end portion of the pipe or union 4.

In alternative embodiments such shoulder 5 can also be omitted.

Figure 3:
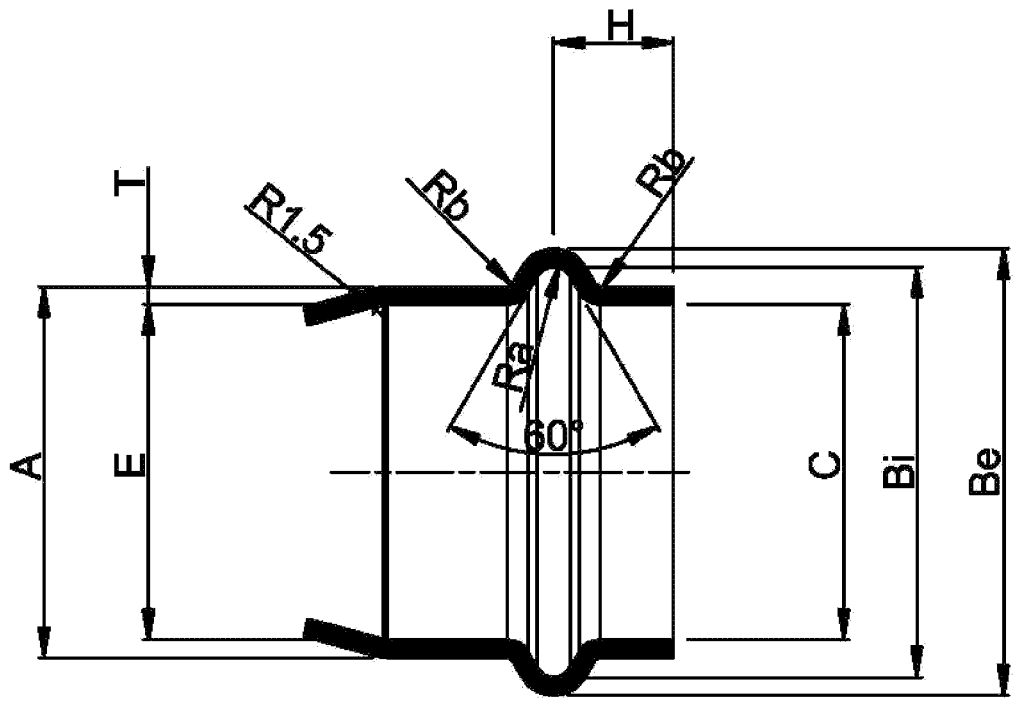
FIG. 3 is an axial section view of the fitting showing typical dimension configurations thereof for different diameters of the pipe.

The bulge 101 has, in the non-pressed condition of press fitting P, still seen in the longitudinal section of tubular body 1, the section of an isosceles triangle. In the present embodiment, such as shown in FIG. 3, the vertex angle, that is the angle at the top of the isosceles triangle, is about 60°.

According to a further preferred characteristic and such as shown in a non-limitative manner in the figure, also the base angles comprised between both sides or flanks of the bulge 101 can be about 60° with respect to the longitudinal axis L of the tubular body 1.

By means of that, the bulge 101 has, in section, the shape of an equilateral triangle, as a special form of isosceles triangle.

On the inner side of the tubular body 1, the bulge 101 coincides with an annular groove 201 wherein the gasket 2 is housed, preferably made of elastic, deformable material, for example an O-ring.

Said gasket can have an inner diameter that, in the non-pressed condition of bulge 101 and without the pipe 4, is at least about 1.5%, preferably about 1.5% to 2.5%, shorter than the inner diameter of cylindrical portions 301, 401. The gasket 2 is therefore arranged between the two side walls of the annular groove 201 defining an angle of 60° therebetween or such that the gasket cannot move during the insertion of the pipe 4 in the cylindrical body up to the shoulder 5.

The cylindrical portions 301 and 401 of the tubular body 1 form a socket for the insertion of the end portion of a pipe or union 4 and have an inner diameter slightly larger than the outer diameter of the pipe 4, while the inner diameter of the gasket 2, in the condition inserted on the fitting, is equal or slightly shorter than the outer diameter of said pipe 4 intended to be inserted in the tubular body 1 of the fitting.

Figure 4:
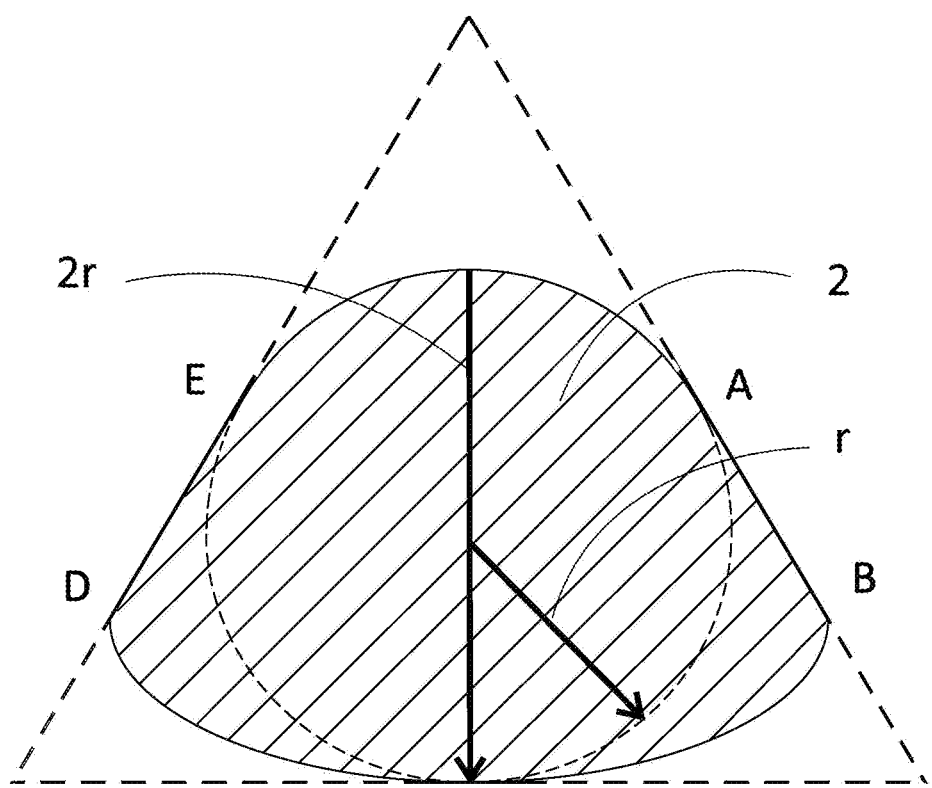
FIG. 4 is an enlarged cross-section view of the gasket according to a preferred embodiment of the invention.

According to a further advantageous improvement, resulting from FIGS. 1 and 2 and 4, the gasket 2 has a cross-section with a particular shape. The cross-section thereof has substantially the shape of an isosceles trapezoid with convex bases or sides.

Such shape is different from the conventional circular shape of O-rings in that with reference to the radial direction with respect to the axis of the tubular body 1, the gasket widens towards the side thereof facing the axis of the tubular body and it tapers towards the opposite side that is the shorter base of the trapezoidal shape.

According to one embodiment, the shape of the cross-section of the gasket 2 can be obtained from an isosceles triangle by cutting out the angles with two opposite arcs of circle, one of which has a radius that is twice the other, such as shown in FIG. 4.

Thus the gasket 2 has a cross-section of increased area with respect to a traditional O-ring gasket that can be inserted in the same housing 201. Consequently, also the compression factor of the gasket and its tightness after compression both by tools intended to press M profiles and tools intended to press V profiles operating on the same hybrid profile of the fitting according to the present invention are perfect and also possibly higher than those that can be obtained by conventional gaskets with circular cross-section.

According to a preferred embodiment of the invention, shown in FIG. 4, the cross-section of the gasket 2 has the shape of a geometrical figure enclosed between segments AB and DE of the two sides of an isosceles triangle with a vertex angle ranging from 55° to 65°, an arc AE of a circumference having radius r, inscribed in said isosceles triangle, and an arc BD having radius 2r centered on the middle point O of the arc AE, where A and E are the tangent points on triangle sides of the inscribed circumference, and B and D are the intersection points with the arc of radius 2r. Preferably, said isosceles triangle has a vertex angle of 60° and it is therefore an equilateral triangle.

By means of its cross-section shape, the gasket 2 fills almost completely the cavity of the housing groove 201. The area of its section is about 20% larger than that of a gasket having a circular cross-section which could have been inserted into the same housing 3 and this leads to a compression factor about 15% higher than that of a conventional gasket having a circular cross-section. Therefore, the tightness of the pressfitting equipped with the gasket according to this embodiment is guaranteed both whether the compression deformation of the bulge 101 and therefore of the gasket 2 occurs by using pressing jaws with a profile corresponding to the M profile and by using pressing jaws with a profile corresponding to the V profile of the fitting. In the first case, with the use of jaws for M profile, the deformation of the bulge 101 and of the gasket 2 causes, after pressing, the bulge and gasket to take a cross-section with a substantially trapezoidal shape, in the second case, with the use of jaws for V profile, generally the shape of the bulge and gasket after pressing tends to be a substantially triangular shape.

With reference to FIGS. 1 and 2 they show the profile of the fitting in combination with a jaw for M profile and V profile respectively.

In both the cases the jaw causes a deformation of the circular portion 301 and of the pipe inserted therein, such as for example described in document DE2725280.

The region 103 of the compression surface of the jaw 3 can have projections arranged on the circumference that generate each one a radial recess with a corresponding extension both in the wall of the cylindrical portion 301 and in the corresponding wall below of the pipe 4. Thus, the pipe and the tubular body 1 of the fitting are mechanically locked with each other preventing the two parts from slipping out or from rotating one with respect to the other and thus generating the mere mechanical coupling with each other.

In FIG. 2 the jaw 3, at part 103 and part 203 coinciding with the cylindrical portions 301 and 401 of the tubular body 1 respectively, has forming projections 303 that deform both the corresponding cylindrical portion 301, 401 of the tubular body 1 and the part of the pipe 4 inside them, in particular, of at least one circumferential band 404 of the pipe 4 adjacent to the annular bulge 101.

Typically the deformation of the V profile changes the shape of the cross-section of the pipe 4 and of the cylindrical portion 301, 401 of the tubular body 1 of the fitting while transforming the circular cross-section thereof into a polygonal cross-section for example hexagonal one and with rounded corners.

Therefore the forming projections 303 of the jaws 3, in the jaw assembly, in the final closing position, form a polygonal forming surface that is at least secant the circular section of the tubular body 1 and of the pipe 4 or even inscribed in said circular section of the tubular body 1 and of the pipe 4 in their condition not deformed yet by the pressing action.

Since such deformation occurs along annular bands with a reduced width in axial direction also in this case a mechanical coupling of the tubular body 1 on the pipe 4 is generated preventing said two parts from axially slipping out and from accomplishing a relative rotation.

Obviously as regards the deformation along the annular band or bands at one or both the cylindrical portions 301, 401 these can be also provided combined with each other or changed with each other with reference to the type of jaw for N or V profile as regards the part thereof acting on the bulge.

With reference to FIG. 4, it shows a preferred embodiment for a fitting according to the present invention made of stainless steel and showing the different dimensions for different diameters of the pipe.

From the dimensions shown in the table it is possible to define some general relations between individual dimensions of specific parts of the fitting and the diameter thereof that is defined by the diameter of existing pipes.

Particularly the following parametric characteristics are clear, which are an optimization among needs having opposing effects but necessary to guarantee that the compression of the fitting, both by a tool suitable for pressing M profiles and by a tool suitable for pressing V profiles, leads to identical and optimal results as regards tightness and its duration over time and the indissolubility of the mechanical constraint.

The most important characteristics are the following ones with reference to the preferred embodiment of FIG. 4:

the two sides connect with each other by a curved portion having a radius ranging from 1 to 2.5 mm, in particular from 1.25 to 1.95 mm.

Said radius has a size ranging from 3 to 7% of the diameter of the tubular body.

Said two side walls that is the two sides of the bulge and of the corresponding groove connect with the corresponding cylindrical portion by a curved flare having equal radii of curvature for said two side walls and ranging from 0.25 to 0.75 mm.

The radial projection of the annular bulge changes for outer diameters of the cylindrical portion of the fitting from 18 mm to 60 mm, from about 2 to 4 mm, in particular from 2.45 to 3.75.

The radial projection of the bulge in relation to the outer diameter of the cylindrical portions on the two sides thereof ranges from 5% to 15% of the outer diameter of said cylindrical portions preferably from 6 to 14% of the outer diameter of said cylindrical portions.

The axial distance between the central axis of the annular bulge and the free edge of the cylindrical portion at the inlet of the fitting ranges from 10 to 16 mm for diameters of the cylindrical portion ranging from 20 to 60 mm.

Such axial distance is higher than 20% of the outer diameter of the cylindrical portions, preferably ranging from 25 to 60% of the outer diameter of the cylindrical portions of the fitting.

The thickness of the wall of the fitting is substantially the same for the whole axial length thereof and in the order of magnitude of about 3 mm.

The invention claimed is:

1. A universal pipe connection system comprising:
a fitting comprising a tubular body with an annular bulge at an end portion, the annular bulge forming on, an inner side of the tubular body, an annular groove housing a sealing gasket, the annular groove being open towards an inside of the tubular body, the end portion extending on a side opposite to an end of the fitting with a cylindrical portion,
wherein said tubular body provides a fitting socket for an end portion of a pipe; and
at least one pressing tool having at least two opposite pressing jaws, which are configured to cooperate with said end portion of the fitting, by surrounding the end portion of the fitting along its circumference, the pressing jaws having a profile of a surface in contact with said end portion of the fitting shaped to press said end portion of the fitting against the end portion of the pipe inserted into said fitting, causing, in at least one circumferential band adjacent to the annular bulge, a contemporaneous deformation of a wall of the pipe and of the cylindrical portion of said end portion of the fitting, so that the end portion of the fitting and the wall of the pipe become mechanically clamped together in a circumferential and axial direction and a deformation of the annular bulge presses the gasket, generating a sealing effect between said tubular body and the end of the pipe inserted therein,
wherein:
the annular bulge and the annular groove are provided at a given axial distance from the end of the fitting, there being provided the cylindrical portion between said end of the fitting and a side of the bulge facing said end of the fitting;
the annular bulge and the groove have such a geometry and size to cooperate alternatively with two different types of pressing tools selected among a pressing tool having a M profile and a pressing tool having a V profile;
the universal pipe connection system comprises, alternatively or in combination, both the pressing tool with the M profile and the pressing tool having the V profile; and
wherein the tubular body comprises the annular bulge and the annular groove each having two side walls and the cylindrical portion connected thereto with a curved flare, the annular bulge having a radial projection with respect to a diameter of an outer side of the cylindrical portion; and
wherein:
the two sides walls are connected with each other by a curved portion having a radius ranging from 1 mm to 2.5 mm;
said radius has a size ranging from 3% to 7% of a diameter of the tubular body;
said two side walls form two sides of the bulge and of the annular groove and are connected to the cylindrical portion by the curved flare having an equal radius of curvature as said two side walls and ranging from 0.25 mm to 0.75 mm;
the radial projection of the annular bulge changes for outer diameters of the cylindrical portion of the fitting from 18 mm to 60 mm, and from 2 mm to 4 mm;
the radial projection of the annular bulge in relation to a diameter of the outer side of cylindrical portions on the two sides thereof ranges from 5% to 15% of the diameter of the outer side of said cylindrical portions;
an axial distance between a central axis of the annular bulge and a free edge of the cylindrical portion at a port of the fitting ranges from 10 mm to 16 am for diameters of the cylindrical portion ranging from 20 mm to 60 mm;
the axial distance is higher than 20% of an outer diameter of the cylindrical portions; and
a thickness of a wall of the fitting is essentially the same for an entire axial length thereof and is about 3 mm.

2. The universal pipe connection system according to claim 1, wherein the side walls or the radial sides of said annular bulge and of said annular groove form therebetween an angle ranging from 50° to 70°.

3. The universal pipe connection system according to claim 1, wherein the sealing gasket has a non-circular cross-section.

4. The universal pipe connection system according to claim 3, wherein the sealing gasket has a cross-section widening towards an open side of the annular groove in a manner corresponding to a sectional shape of said annular groove having rounded sides.

5. The universal pipe connection system according to claim 3, wherein the sealing gasket has a cross-section shaped as an isosceles trapezoid with convex bases.

6. The universal pipe connection system according to claim 3, wherein the sealing gasket has a cross-section essentially shaped as a geometrical figure enclosed between two segments of equal sides of an isosceles triangle with a vertex angle ranging from 55° to 65°, a first arc of circumference of radius r inscribed in said isosceles triangle, and an arc of radius 2r centered in a middle point of said first arc.

7. The universal pipe connection system according to claim 6, wherein said isosceles triangle is an equilateral triangle.

8. The universal pipe connection system according to claim 1, wherein the sealing gasket has an inner diameter equal to or smaller than an inner diameter of the tubular body.

* * * * *